US012634999B2

(12) United States Patent
Ugurlu

(10) Patent No.: US 12,634,999 B2
(45) Date of Patent: May 19, 2026

(54) RACH RESOURCE CONFIGURATION FOR MULTIPLE PRACH TRANSMISSIONS

(71) Applicant: MediaTek Singapore Pte. Ltd., Singapore (SG)

(72) Inventor: Ahmet Umut Ugurlu, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 306 days.

(21) Appl. No.: 18/371,562

(22) Filed: Sep. 22, 2023

(65) Prior Publication Data

US 2024/0107588 A1 Mar. 28, 2024

Related U.S. Application Data

(60) Provisional application No. 63/377,364, filed on Sep. 28, 2022.

(51) Int. Cl.
H04W 74/0833 (2024.01)
(52) U.S. Cl.
CPC ............................... H04W 74/0833 (2013.01)
(58) Field of Classification Search
CPC ........... H04W 74/0833; H04W 56/001; H04W 74/006
See application file for complete search history.

(56) References Cited

U.S. PATENT DOCUMENTS

| | | | | |
|---|---|---|---|---|
| 2020/0128587 A1* | 4/2020 | Qian | .......................... | H04W 8/24 |
| 2021/0368551 A1* | 11/2021 | Xiong | .................... | H04W 48/08 |
| 2023/0276504 A1* | 8/2023 | Kim | .................. | H04W 74/0833 370/329 |
| 2024/0049294 A1* | 2/2024 | Xiong | .................. | H04B 7/0617 |
| 2025/0056623 A1* | 2/2025 | Marcone | .............. | H04L 5/0005 |
| 2025/0193939 A1* | 6/2025 | Ly | .......................... | H04W 74/004 |

* cited by examiner

Primary Examiner — Abdullahi Ahmed
(74) Attorney, Agent, or Firm — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE receives RACH occasion (RO) configurations from a base station. The RO configurations indicate associations between one or more SSBs and ROs. The UE selects one SSB from the one or more SSBs received from the base station. The UE determines a number of multiple PRACH transmissions based on a RSRP measurement of the selected SSB. The UE determines a set of RO groups associated with the selected SSB based on the RO configurations and the determined number of multiple PRACH transmissions. The UE transmits multiple PRACHs on a selected RO group from the determined set of RO groups.

20 Claims, 12 Drawing Sheets

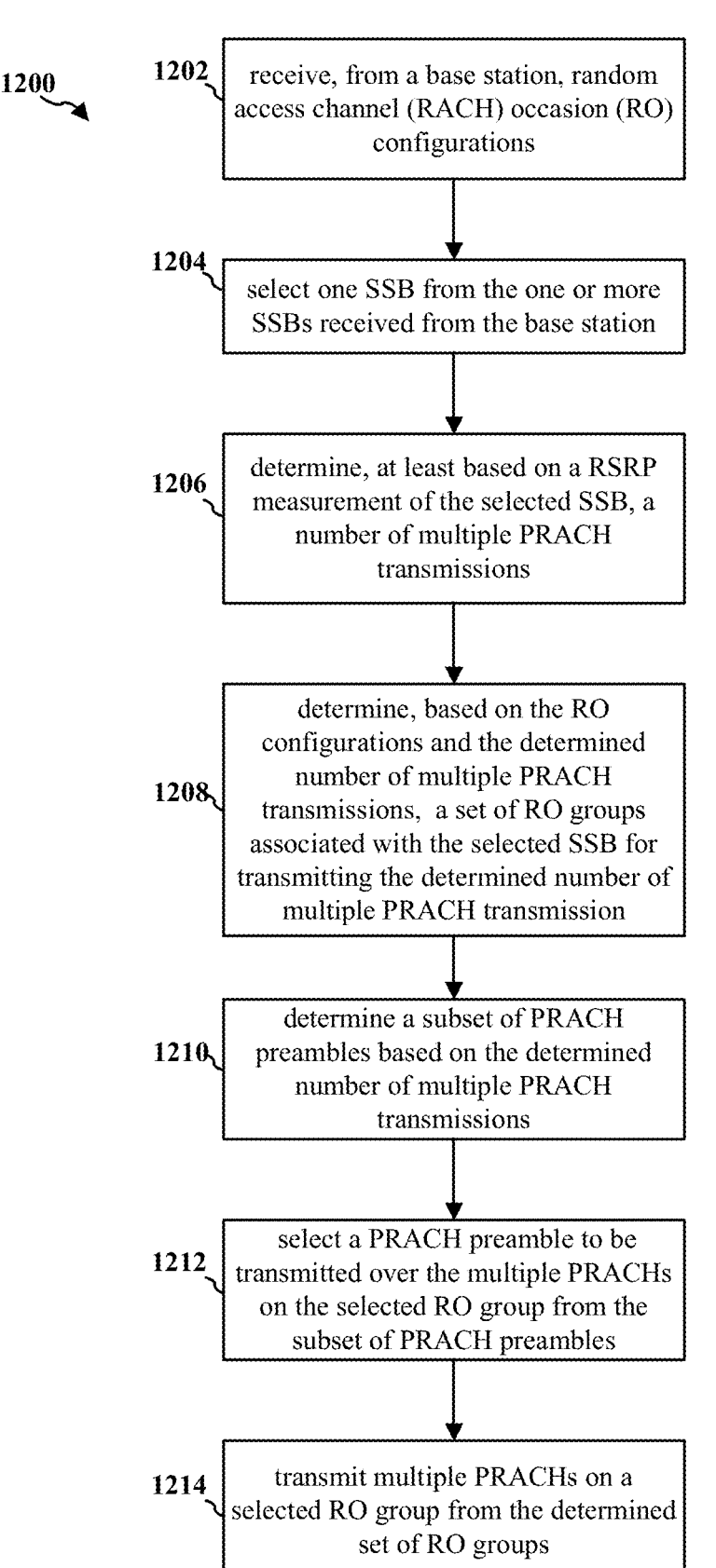

1200

1202 receive, from a base station, random access channel (RACH) occasion (RO) configurations 1204 select one SSB from the one or more SSBs received from the base station 1206 determine, at least based on a RSRP measurement of the selected SSB, a number of multiple PRACH transmissions 1208 determine, based on the RO configurations and the determined number of multiple PRACH transmissions, a set of RO groups associated with the selected SSB for transmitting the determined number of multiple PRACH transmission 1210 determine a subset of PRACH preambles based on the determined number of multiple PRACH transmissions 1212 select a PRACH preamble to be transmitted over the multiple PRACHs on the selected RO group from the subset of PRACH preambles 1214 transmit multiple PRACHs on a selected RO group from the determined set of RO groups

FIG. 12

RACH RESOURCE CONFIGURATION FOR MULTIPLE PRACH TRANSMISSIONS

CROSS-REFERENCE TO RELATED APPLICATION(S)

This application claims the benefits of U.S. Provisional Application Ser. No. 63/377,364, entitled "RACH RESOURCE CONFIGURATION FOR MULTIPLE PRACH TRANSMISSIONS" and filed on Sep. 28, 2022, which is expressly incorporated by reference herein in its entirety.

BACKGROUND

Field

The present disclosure relates generally to communication systems, and more particularly, to techniques of performing multiple physical random access channel (PRACH) preamble transmissions in a repetition at user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5GNR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives random access channel (RACH) occasion (RO) configurations from a base station. The RO configurations indicate associations between one or more synchronization signal blocks (SSBs) and ROs. The UE selects one SSB from the one or more SSBs received from the base station. The UE determines a number of multiple PRACH transmissions based on a RSRP measurement of the selected SSB. The UE determines a set of RO groups associated with the selected SSB based on the RO configurations and the determined number of multiple physical random access channel (PRACH) transmissions. The UE transmits multiple PRACHs on a selected RO group from the determined set of RO groups.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a flow chart of a method (process) for performing multiple PRACH transmissions

DETAILED DESCRIPTION

Figure 1:
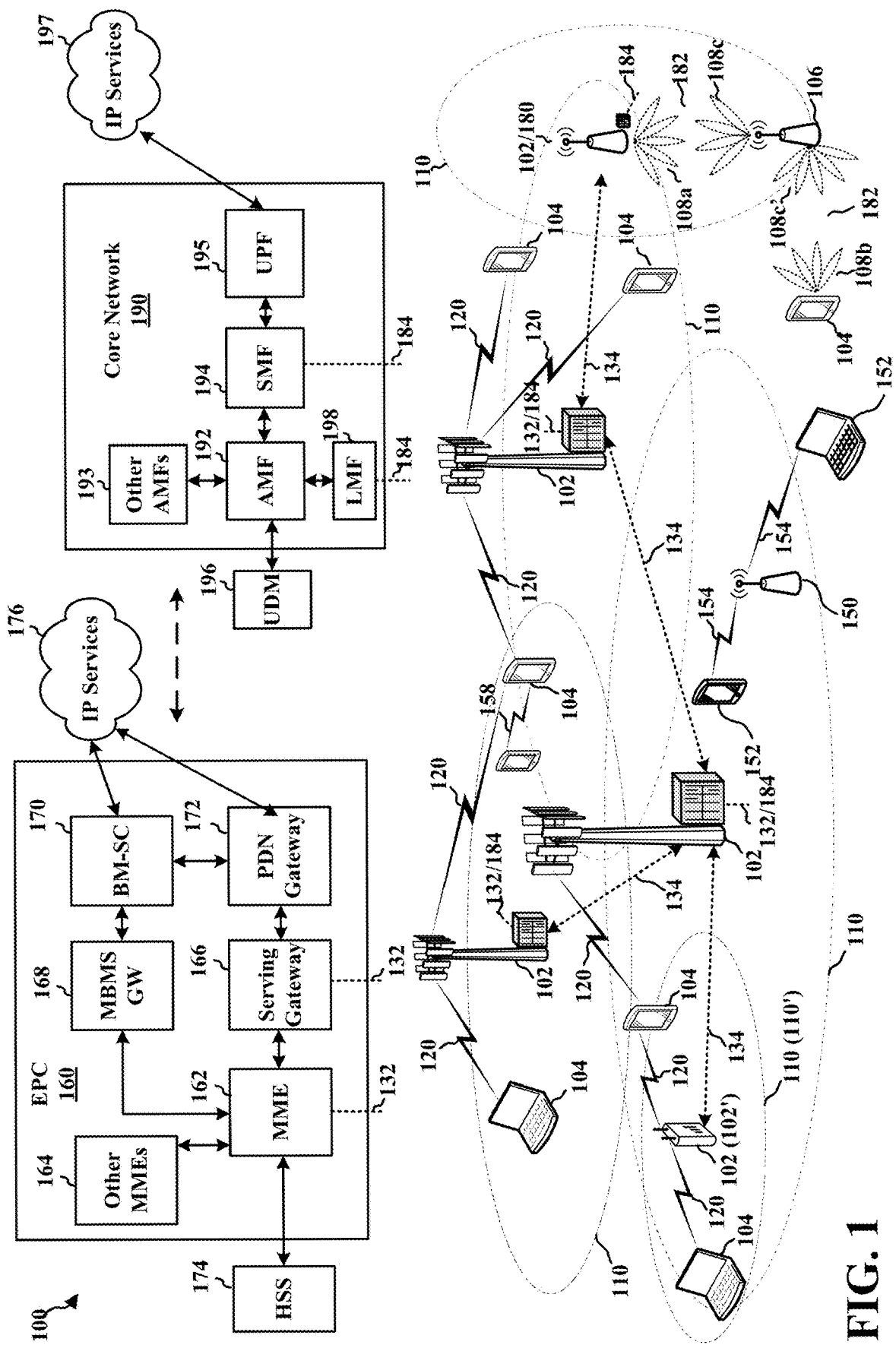
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
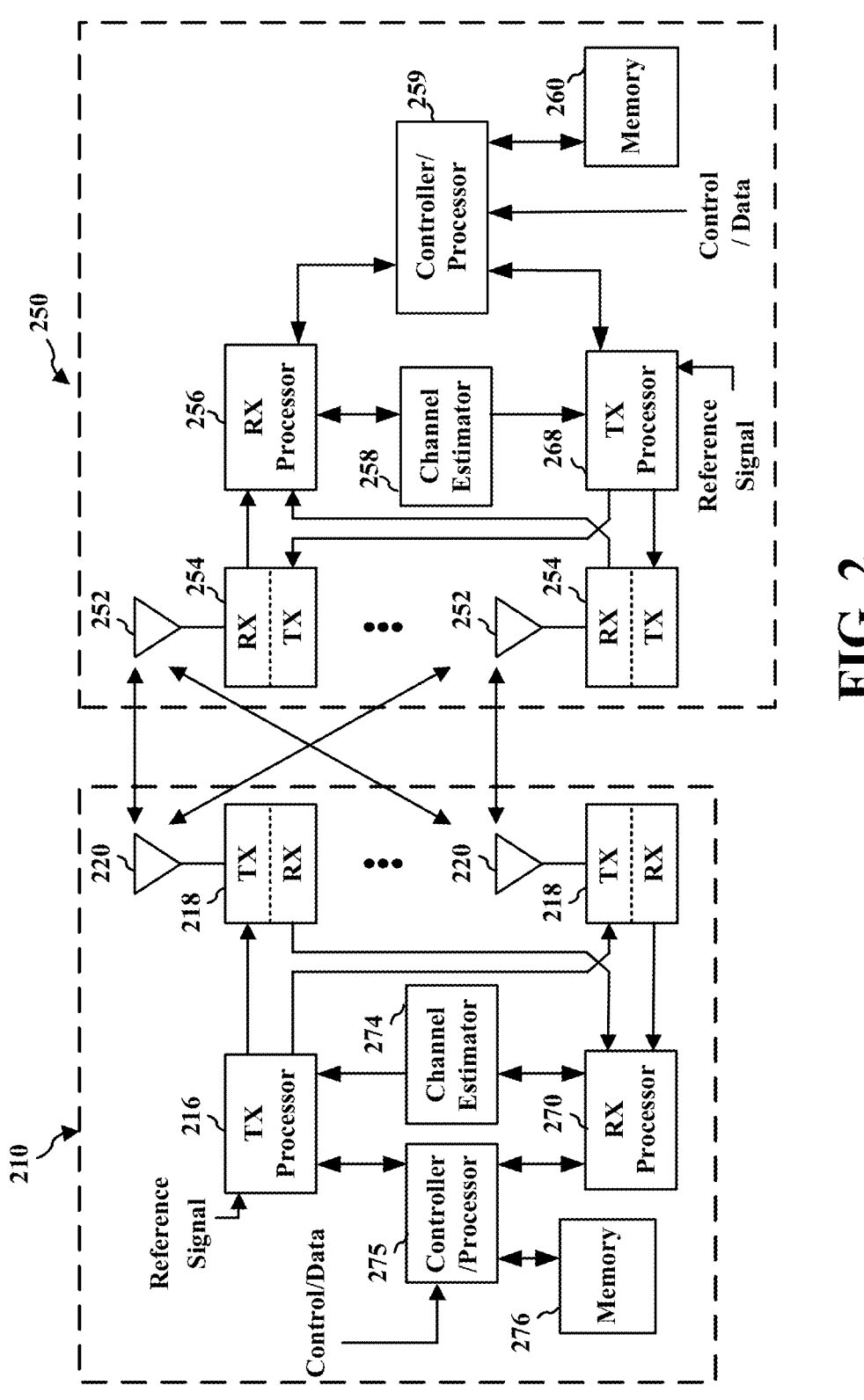
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers for each RB with a subcarrier spacing (SCS) of 60 kHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
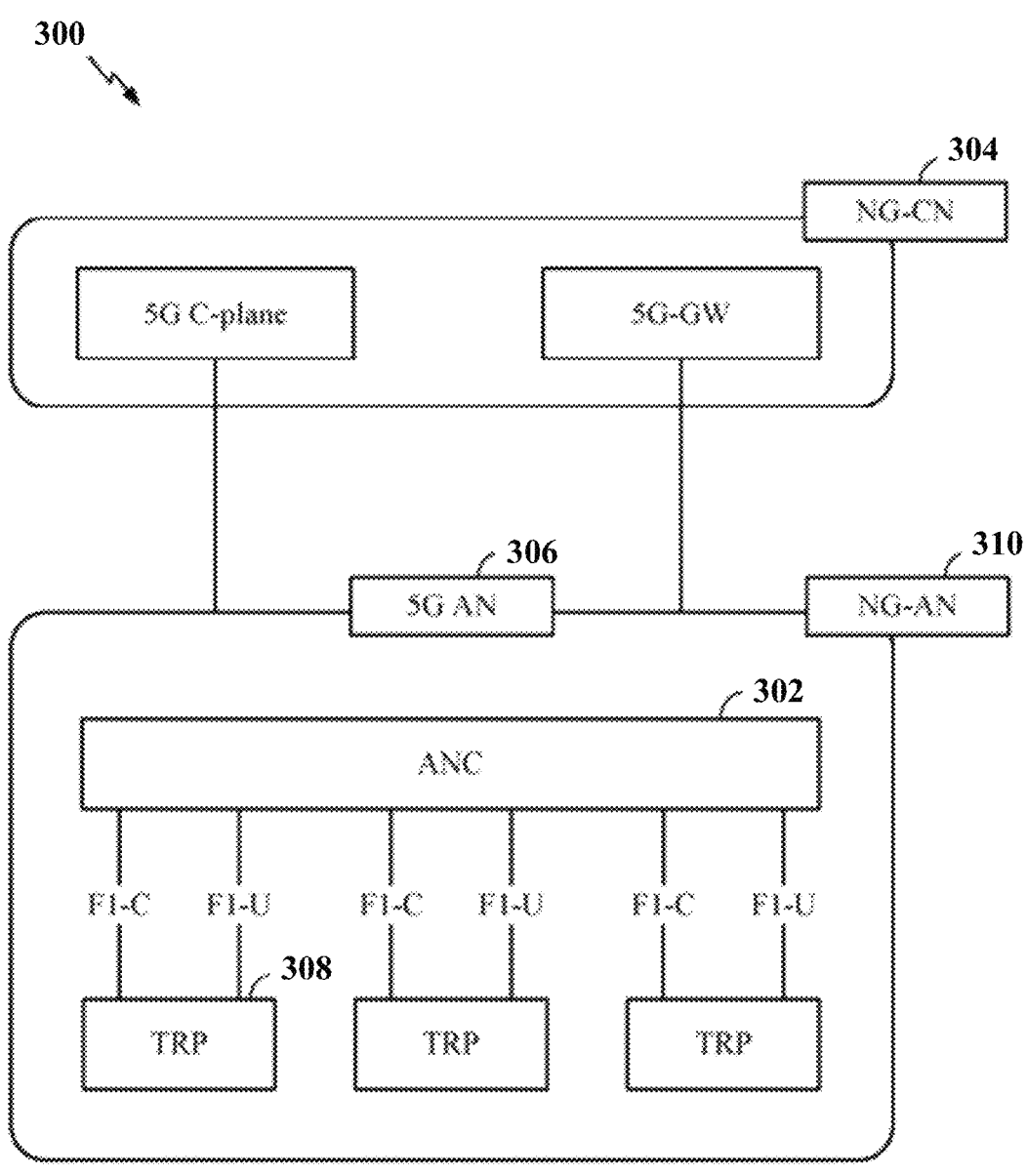
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
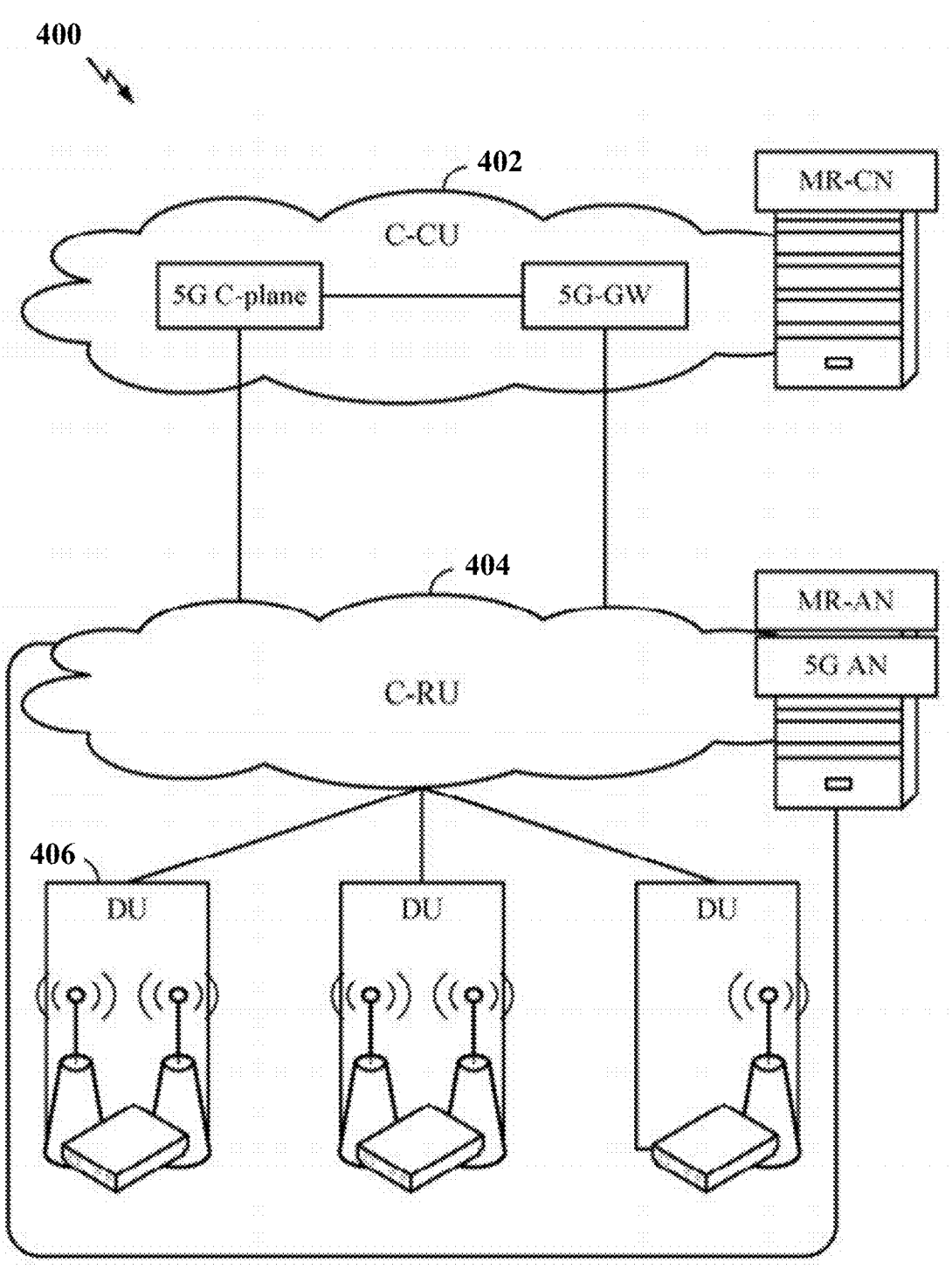
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
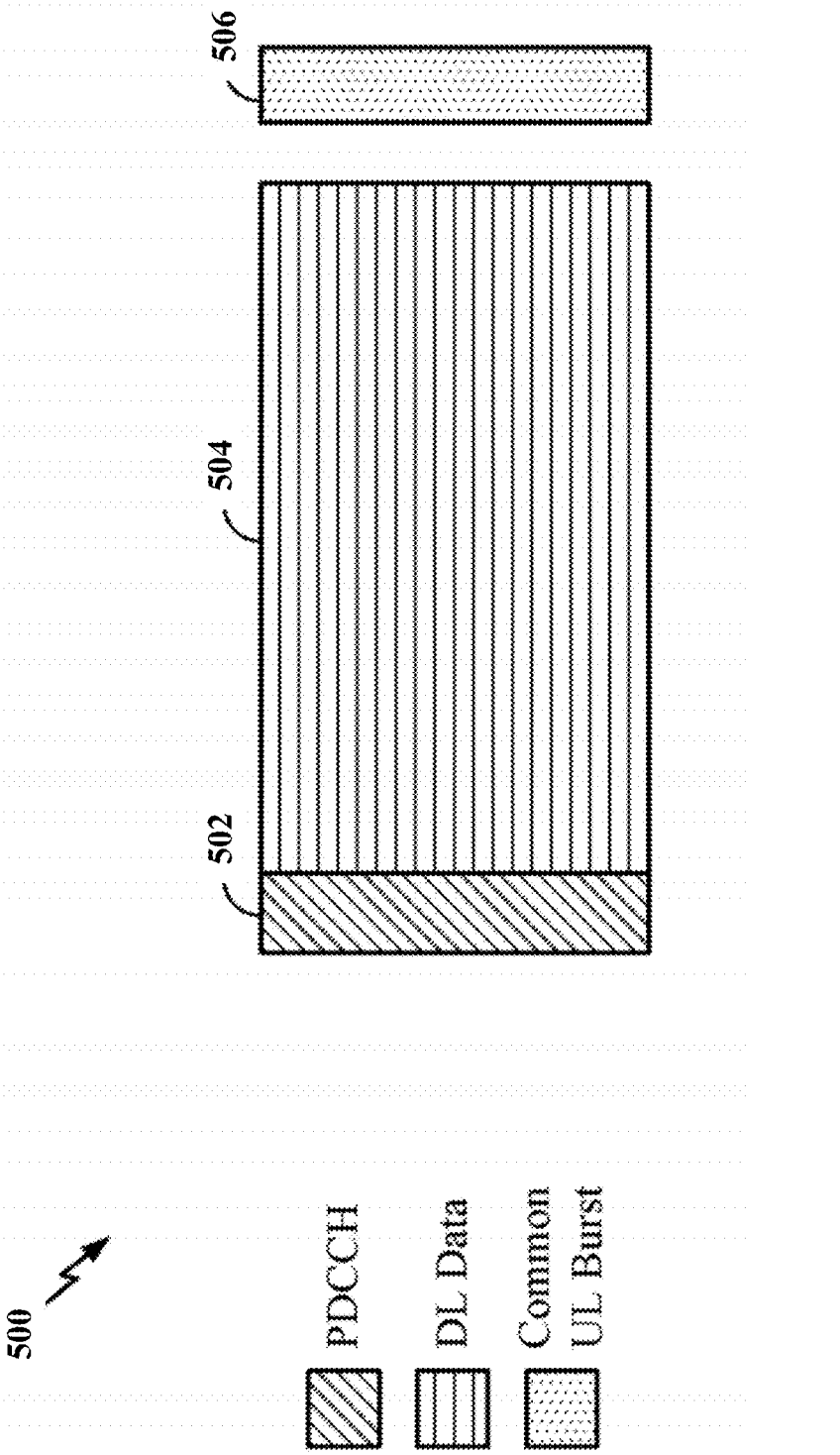
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
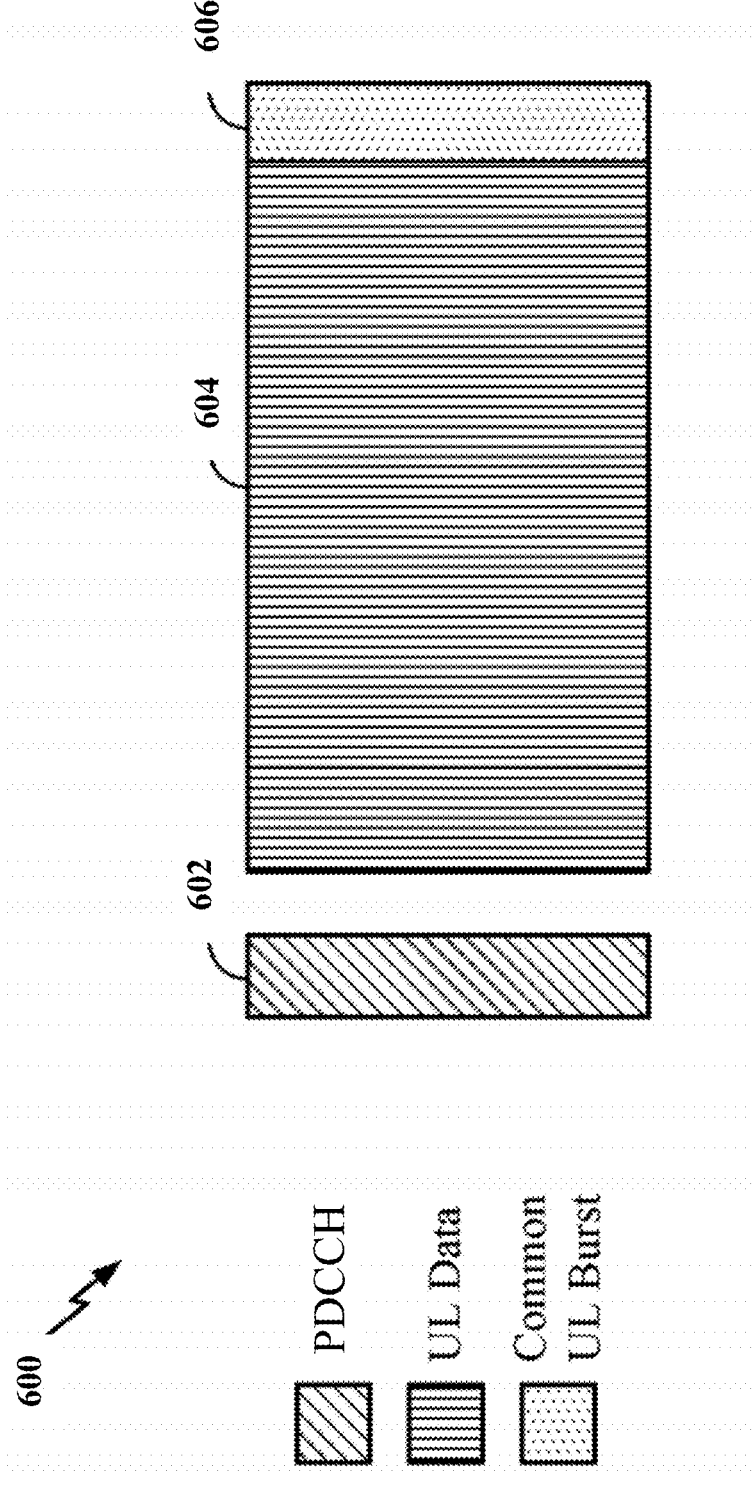
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In a centralized network, for example with a next generation base station (gNB), and/or coordination through the core network for a group of gNBs, the time/frequency resources for transmission can be well controlled to reduce interference. This means the transmission by UEs is controlled by the network (base stations), and the transmission among gNBs can also be coordinated to reduce interference with each other.

The sidelink is the transmission between UEs. There are generally two cases where the centralized mechanism applies:

1. The transmission between a group of UEs is coordinated/determined by the gNB(s).
2. The transmission between a group of UEs is coordinated/determined by a master UE, when there is no network. This means a certain level of centralized mechanism may be feasible without a base station.

For a decentralized mechanism, the transmission between a group of UEs may rely on some mechanisms to reduce interference:

1. Sensing the time/frequency resources based on RSRP threshold to find out potential resources for transmission. Then select the resources that are not occupied (lower RSRP) for transmission.
2. When a UE transmits a signal in a slot, the UE can also deliver some information that the time/frequency resources are occupied. The UE can indicate in the control channel (e.g., Sidelink Control Information, SCI) that the current slot and a set of future slots are being reserved/occupied. Thus, when other UEs decode the SCI, they can know the occupancy status of future slots.

The present disclosure aims to enhance the current RACH framework to support multiple PRACH transmissions in an optimized manner. Specifically, the techniques described infra may address the following aspects of a RACH procedure when a UE is transmitting multiple PRACH repetitions:

1) PRACH preambles to transmit for contention based random access (CBRA).
2) Time-frequency resources to use for transmitting a set of PRACH repetitions.
3) Resource efficiency optimization in the cell while minimizing the RACH delay experienced by the user?
4) Minimization of the rate of collision probability between different users attempting PRACH transmissions in the same cell. This includes:
   (4a) A potential collision between a legacy user (with a single PRACH transmission) and a new user (with multiple PRACH transmissions).
   (4b) A potential collision between a new user (with multiple PRACH transmissions) and another new user (with multiple PRACH transmissions).

If a UE is configured to transmit multiple PRACH transmissions, a set of RACH occasions needs to be identified based on the detected strongest SSB index. A UE may transmit a PRACH preamble repetition set or bundle. All PRACH preamble transmissions in the same repetition set/bundle are transmitted according to the same SSB index, which has been identified to be the strongest SSB by the UE.

Once the UE determines the index of the strongest SSB in a cell, the UE can determine the set of RACH resources that are allowed to be used for the transmission of the current PRACH preamble repetition set/bundle based on the mapping configuration between RACH occasions and the strongest SSB index.

Furthermore, such mapping association also requires enhancements over the legacy RACH configuration method. Since the UE can transmit multiple PRACH preamble in the same repetition set, a set of RACH resources shall be determined by the UE.

It should be understood that a RACH occasion generally refers to the total number of times or opportunities that RACH is used or can be used within a specific time window. This is usually related to the overall transmission time structure of the system, including a certain number of slots or times allocated for RACH. A RACH resource occasion generally more specifically refers to a wireless resource block that can be allocated to a specific user or data flow within a given RACH occasion. Therefore, a RACH resource occasion can be seen as a more fine-grained resource allocation within a RACH occasion.

Figure 7:
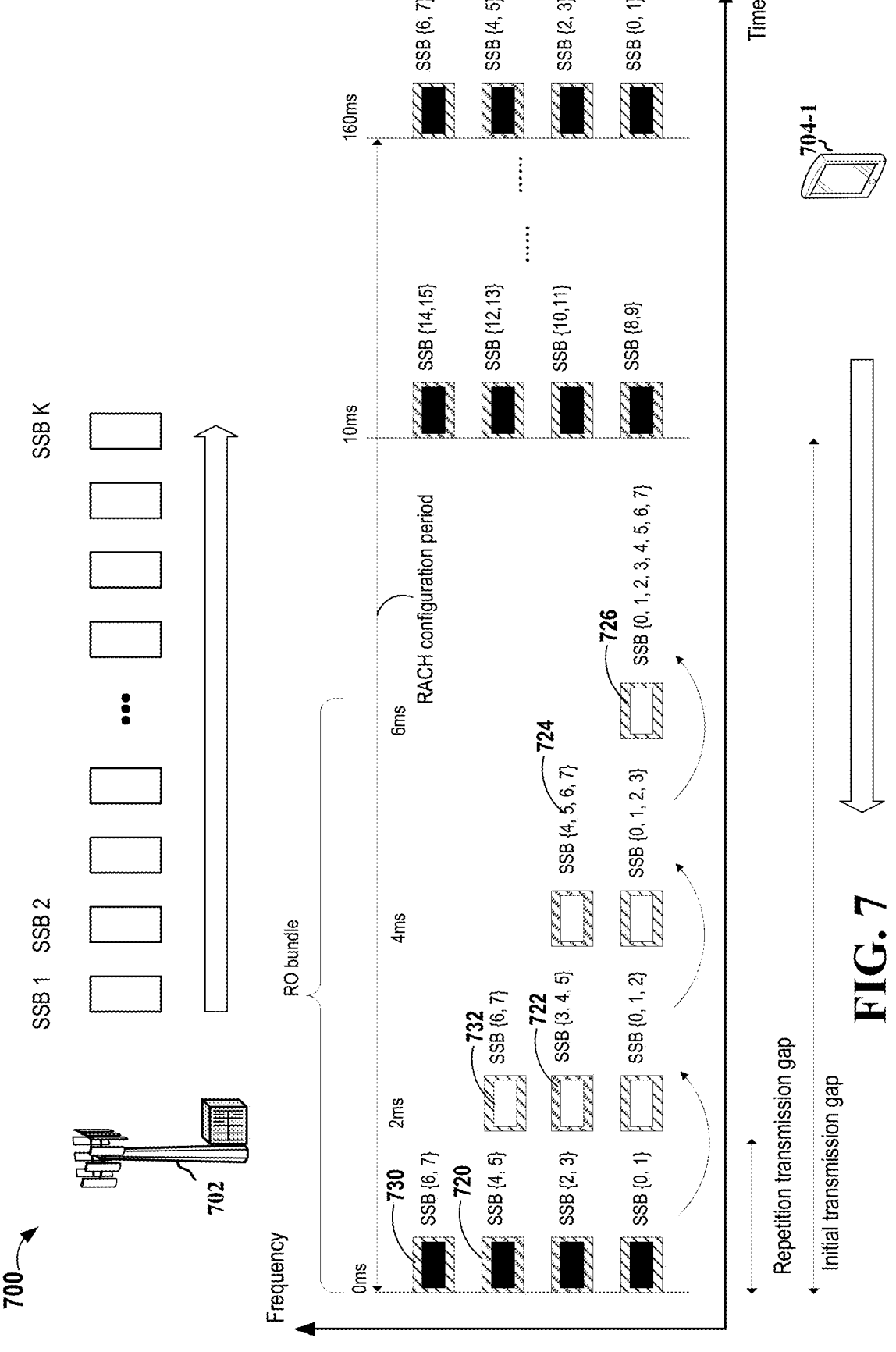
FIG. 7 is a diagram illustrating a first scheme of PRACH preamble repetition transmissions.

FIG. 7 is a diagram 700 illustrating a first scheme of PRACH preamble repetition transmissions between a base station 702 and multiple UEs 704-1 to 704-N. The base station 702 transmits multiple SSB signals labeled SSB 0, SSB 1, . . . , SSB K to the UEs 704-1, 704-2, . . . , 704-N. Each SSB signal has a different spatial direction and is associated with a specific index number. The UE measures the received signal strengths of the different SSB signals and determines the index of the strongest SSB signal. The index of the strongest SSB detected by each UE is then used to determine the PRACH resources and preamble sequences that can be used by that UE, based on mapping configurations pre-defined by the base station 702.

In this example, the RACH resources configured for the UEs 704-1, 704-2, . . . , 704-N has a periodicity of 160 ms. In each period of 160 ms, each of the UEs 704-1, 704-2, . . . , 704-N may select one or more of the configured RACH resources to transmit PRACH preambles as described infra.

More specifically, a UE may use multiple RACH resources in a RACH configuration period (e.g., 160 ms) to transmit multiple PRACH preambles (in a bundle) in repetition. The same mapping association between SSB and RACH resources can be reused within the same RACH configuration period. In particular, the UE may determine, at least based on a reference signal received power (RSRP) measurement of the selected SSB, the number of multiple PRACH transmissions.

In addition, the number of RACH occasions (ROs) can be limited for some numbers of multiple PRACH preamble transmissions in a given time instance. For example, for a bundle of 4 PRACH preamble transmissions, there may be 4 available ROs for the 2nd PRACH preamble transmission and only one available RO for the 4th PRACH preamble transmission.

In certain configurations, the UE may determine a subset of PRACH preambles to use based on the number of multiple PRACH transmissions it decides to transmit. For example, the UE may determine to transmit 4 PRACH transmissions, and accordingly determine a subset of preambles configured for 4 transmission PRACH bundles by the base station. Alternatively, the base station may directly indicate the subset of preambles to use based on the PRACH transmission number.

Furthermore, the base station may pre-configure associations between each SSB, each candidate number of multiple PRACH transmissions (e.g. 2, 4, etc.), and a corresponding set of PRACH preambles. Based on the SSB selected and number of transmissions determined, the UE can determine the specific set of preambles to use from the pre-configured mappings.

Additionally, the number of multiple PRACH transmissions may also be pre-configured by the base station through an indication to the UEs (claim 14). The UE can determine how many transmissions to use based on this indication, in addition to metrics like the RSRP measurement.

In FIG. 7, the horizontal axis is time domain, the vertical axis is frequency domain. In this example, K is 15. Further, the base station 702 configures the UEs 704-1, 704-2, . . . , 704-N to transmit initial PRACH preambles corresponding to SSBs 0 to 7 at particular ROs at 0 ms in a RACH configuration period (e.g., 160 ms) and to transmit initial PRACH preambles corresponding to SSBs 8 to 15 at ROs at 10 ms in the RACH configuration period. The UE uses one of these ROs for a single PRACH preamble transmission.

In certain configurations, for multiple PRACH preamble transmissions, the UE transmits the selected PRACH preamble corresponding to a particular target SSB in a bundle of ROs as described infra.

The base station 702 broadcasts RO configurations that specifies various ROs to be used for PRACH preamble transmissions. In this example, for PRACH preambles corresponding to SSBs 0-7, the base station 702 configured ROs at 2 ms, 4 ms, and 6 ms in addition to ROs at 0 ms.

In this example, assuming that the UE 704-1 detects SSB 4 as the strongest SSB, the UE 704-1 accordingly selects one from a set of PRACH preambles corresponding to SSB 4 to use. The UE 704-1 may transmit the PRACH preamble (corresponding to SSB 4) at multiple corresponding ROs. In certain configurations, the UE 704-1 may determine the number of ROs in the bundle by itself. In certain configurations, the base station 702 may have previously indicated a PRACH repetition configuration specifying the number of ROs in a bundle. In one scenario, the UE 704-1 may determine that a bundle of 2 ROs should be used. Accordingly, the UE 704-1 sends the PRACH preamble (corresponding to SSB 4) at the initial two corresponding ROs, which are a RO 720 at 0 ms and a RO 722 at 2 ms of the RACH configuration period (e.g., 160 ms). In another scenario, the UE 704-1 may determine that a bundle of 4 ROs should be used. Accordingly, the UE 704-1 sends the PRACH preamble (corresponding to SSB 4) at the initial 4 corresponding ROs, which are the RO 720 at 0 ms, the RO 722 at 2 ms, a RO 724 at 4 ms, and a RO 726 at 6 ms of the RACH configuration period (e.g., 160 ms).

Further, in this example, the base station 702 configures ROs for PRACH preamble repetition in time domain only. That is, different ROs at different time points are configured for repeat transmission of a particular PRACH preamble. However, no multiple PRACH preamble transmissions in repetition are configured for the same at time point.

Further, in certain scenarios, while the UE 704-1 determines that the strongest SSB detected is SSB 4, the UE 704-2 may determine that the strongest SSB detected is SSB 3. In the configuration shown in FIG. 7, the ROs corresponding to SSBs 3 and 4 do not overlap at 0 ms and 4 ms, but overlaps at 2 ms and 6 ms of the RACH configuration period (e.g., 160 ms). That is, the UE 704-1 and the UE 704-2 may both transmit PRACH preambles at the RO 722 and at the RO 726. Nonetheless, the base station 702 may configure different orthogonal sets of PRACH preambles corresponding to SSB 3 and SSB 4. Accordingly, the base station 702 may distinguish one PRACH preamble (corresponding to SSB 3) from the other PRACH preamble (corresponding to SSB 4) when receive them at the RO 722 and the RO 726.

Although the example in FIG. 7, ROs for PRACH preamble repetitions are only added at 2 ms, 4 ms and 6 ms between ROs for initial PRACH preambles at 0 ms and 10 ms, the time points and quantities of these ROs for PRACH preamble repetitions are flexible and configurable. For example, ROs may be added at 8 ms for a 5th transmission. Further, the repetition transmission gap between two ROs at different time is configurable. In this example, the repetition transmission gap is 2 ms (e.g., between the RO 722 and the RO 724). In another example, the repetition transmission gap may be another duration such as 3 ms, 4 ms, etc.

Using the techniques as described supra, when the PRACH preambles received at the base station 702 are not strong enough (e.g., when the UE 704-1 at the edge of the cell), the base station 702 can combine the PRACH preambles received at multiple repetition ROs and then decode the combined signals.

In certain configurations, the number of repetition transmissions (e.g., 2, 3, 4, etc.) is preconfigured by the base station 702. Otherwise, the base station 702 may need to determine by itself whether the multiple PRACH preamble repetition is used and the configuration of the repetition. The configuration of the first scheme may improve latency and resource efficiency.

Figure 8:
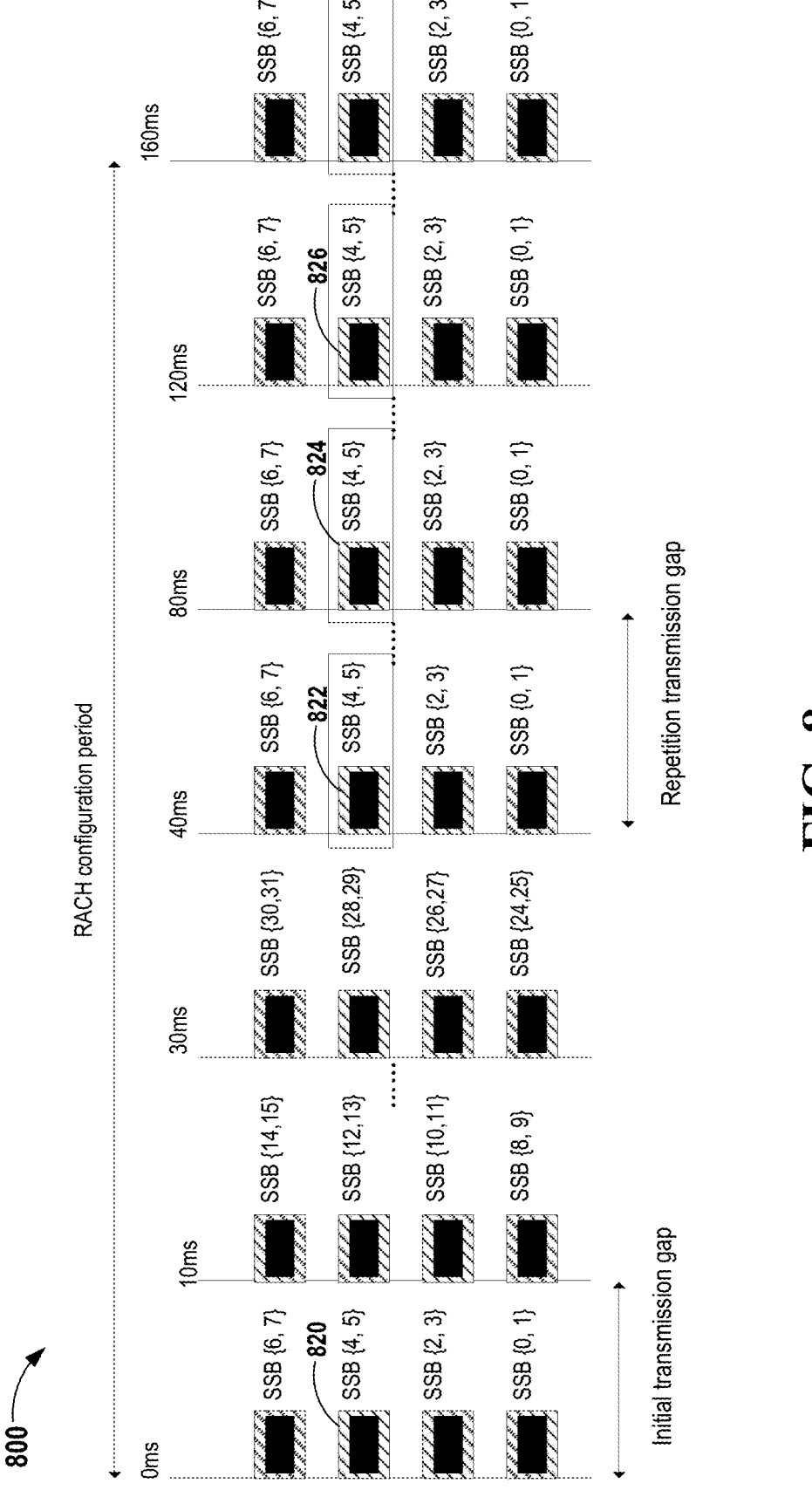
FIG. 8 is a diagram illustrating a second scheme of PRACH preamble repetition transmissions.

FIG. 8 is a diagram 800 illustrating a second scheme of PRACH preamble repetition transmissions. In this example, K is 31 and the base station 702 transmits SSBs 0 to 31 to the UEs 704-1, 704-2, . . . , 704-N. For example, within the RACH configuration period (e.g., 160 ms), the base station 702 may configure initial PRACH preamble transmissions at ROs with an initial transmission gap of 10 ms. As shown, the base station 702 configures ROs for transmissions of PRACH preambles corresponding to SSBs 0-7 at 0 ms, for transmissions of PRACH preambles corresponding to SSBs 8-15 at 10 ms, for transmissions of PRACH preambles corresponding to SSBs 16-23 at 20 ms, and for transmissions of PRACH preambles corresponding to SSBs 24-31 at 30 ms. In this example, the duration from after 30 ms to 160 ms are not configured for initial PRACH preamble transmissions but may be used for repetition PRACH preamble transmissions.

In this scheme, ROs that may be used for initial PRACH preambles are reconfigured for repetition PRACH preamble transmissions. A UE transmitting a PRACH preamble repetition set would follow the pre-existing mapping association, but such a repetition set could be transmitted across multiple ROs in a RACH configuration period (e.g., 160 ms).

In this example, the ROs corresponding to SSB 0-7 are repeated starting at 40 ms with a repetition transmission gap of 40 ms. In other words, the same ROs corresponding to SSB 0-7 are configured at 10 ms, 40 ms, 80 ms, 120 ms within the RACH configuration period (e.g., 160 ms).

In this example, assuming that the UE 704-1 detects that the strongest SSB received is SSB 4, the UE 704-1 may transmit PRACH preamble (corresponding to SSB 4) at ROs 820, 822, 824, 826. In certain configurations, the UE 704-1 can determine the number of ROs (e.g., 2, 4, etc.) in a bundle for repetition PRACH preamble transmissions. In certain configurations, the base station 702 may configure the RO bundle. For a repetition of 2 transmission, the UE 704-1 transmits PRACH preamble (corresponding to SSB 4) at ROs 820, 822. For a repetition of 4 transmission, the UE 704-1 transmits PRACH preamble (corresponding to SSB 4) at ROs 820, 822, 824, 826.

Figure 9:
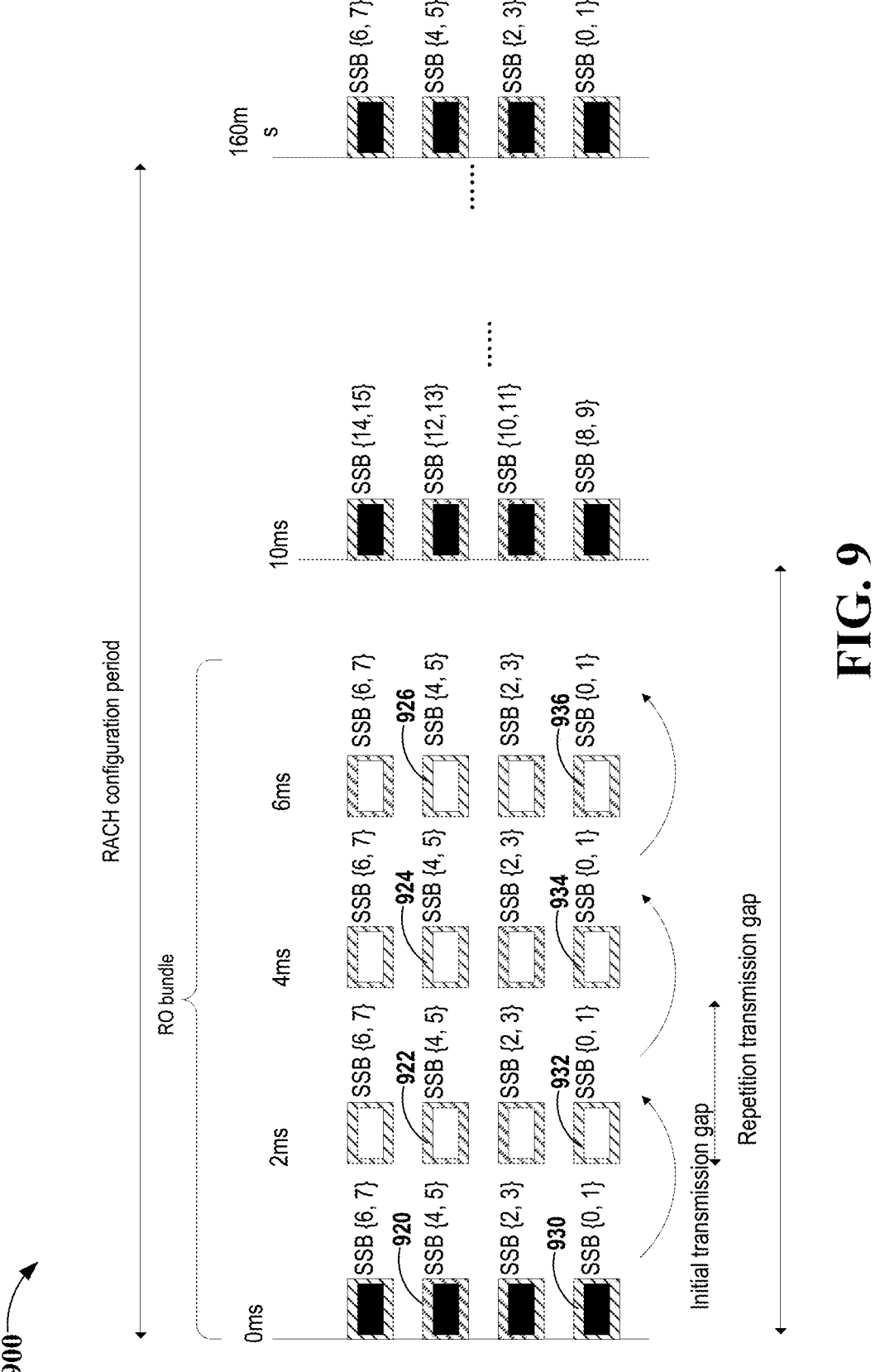
FIG. 9 is a diagram illustrating a third scheme of PRACH preamble repetition transmissions.

FIG. 9 is a diagram 900 illustrating a third scheme of PRACH preamble repetition transmissions. In this example, K is 15. Further, the base station 702 configures the UEs 704-1, 704-2, . . . , 704-N to transmit initial PRACH preambles corresponding to SSBs 0 to 7 at particular ROs at 0 ms in a RACH configuration period (e.g., 160 ms) and to transmit initial PRACH preambles corresponding to SSBs 8 to 15 at ROs at 10 ms in the RACH configuration period. The UE uses one of these ROs for a single PRACH preamble transmission.

In this example, the ROs corresponding to SSB 0-7 are repeated after 0 ms and prior to 10 ms with a repetition transmission gap of 2 ms for 3 additional transmissions. In other words, the same ROs corresponding to SSB 0-7 are configured at 0 ms, 2 ms, 4 ms, and 6 ms within the RACH configuration period (e.g., 160 ms). The ROs at each of the repetition time point has the same frequency division multiplexing (FDM) pattern.

In this example, assuming that the UE 704-1 detects that the strongest SSB received is SSB 4, the UE 704-1 may transmit PRACH preamble (corresponding to SSB 4) at ROs 920, 922, 924, 926. In certain configurations, the UE 704-1 can determine the number of ROs (e.g., 2, 4, etc.) in a bundle for repetition PRACH preamble transmissions. In certain configurations, the base station 702 may configure the RO bundle. For a repetition of 2 transmission, the UE 704-1 transmits PRACH preamble (corresponding to SSB 4) at ROs 920, 922. For a repetition of 4 transmission, the UE 704-1 transmits PRACH preamble (corresponding to SSB 4) at the RO 920 at 0 ms, RO 922 at 2 ms, RO 924 at 4 ms, and RO 926 at 6 ms. The mapping between SSB 4 and these ROs is preconfigured by the base station 702.

Similarly, the ROs corresponding to SSB 8 to 15 can be repeated after the initial transmission of PRACH preambles corresponding to those SSBs at 10 ms at 12 ms, 14 ms, and 16 ms. Assuming that the UE 704-1 has selected a SSB from the SSBs 8 to 15 and the repetition has 4 transmissions, the UE 704-1 may transmit the corresponding PRACH preambles at 10 ms, 12 ms, 14 ms, and 16 ms.

Referring back to FIG. 7, in the first scheme, unlike third scheme, a different FDM pattern from the ROs for initial PRACH preamble transmissions are used for better resource efficiency. In the first scheme, the ROs for repetition PRACH preamble transmissions may be mapped to resources different from the resources of ROs for initial PRACH transmissions. For example, at 0 ms, the ROs corresponding to SSBs 0 to 7 are split across 4 resources, and at 2 ms, the ROs corresponding to the same set of SSBs are across 3 resources. Continuing, at 4 ms, the ROs corresponding to the same set of SSBs are two resources, and at 6 ms the ROs corresponding to the same set of SSBs is fully allocated in 1 resource.

In the first scheme, the mapping between the SSBs and RACH resources may change over time. For example, at 0 ms, SSBs 0-7 may be distributed across 4 RACH resources. But at 2 ms, the same set of SSBs 0-7 is redistributed across only 3 RACH resources, and so on. This allows the base station 702 to limit the number of available RACH resources for later transmissions in a PRACH repetition bundle, providing a tradeoff between resource efficiency and collision probability. The UE 704-1 can transmit an initial PRACH preamble corresponding to its detected strongest SSB (e.g. SSB 4) at 0 ms, and then transmit repetitions at 2 ms, 4 ms, 6 ms based on the configured mapping. Thus, the first scheme provides more flexibility in SSB-to-RACH resource mapping over time.

Figure 10:
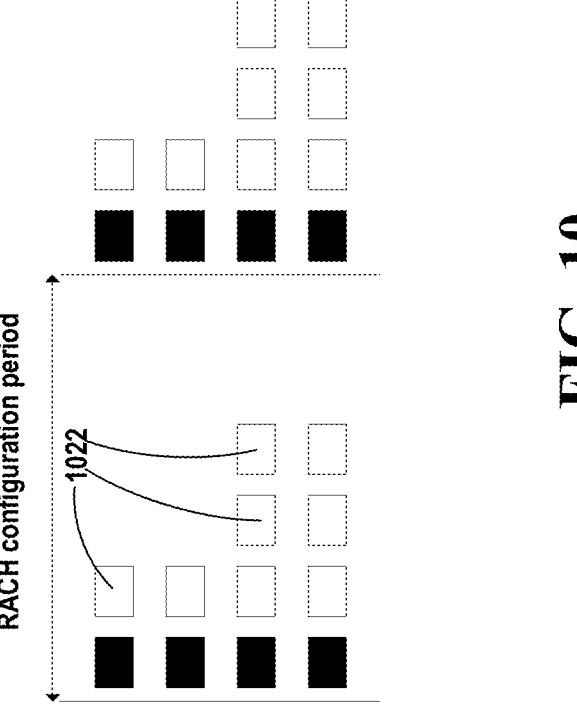
FIG. 10 is a diagram illustrating a first resource configuration for mapping between SSBs and RACH resources.

Moreover, in the first scheme, different resource configurations can be considered for the mapping between SSBs and RACH resources. FIG. 10 is a diagram 1000 illustrating a first resource configuration for mapping between SSBs and RACH resources. This configuration allows for more ROs 1022 for repetition PRACH preamble transmissions for UEs. This provides more transmission opportunities for the UEs at the cost of lower resource efficiency.

Figure 11:
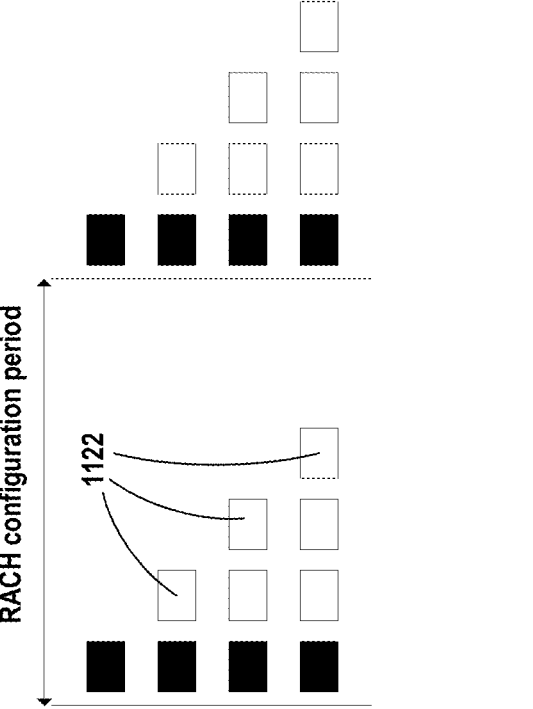
FIG. 11 is a diagram illustrating a second resource configuration for mapping between SSBs and RACH resources.
Figure 11:

FIG. 11 is a diagram 1100 illustrating a second resource configuration for mapping between SSBs and RACH resources. This configuration has fewer ROs 1122 for repetition PRACH preamble transmissions and is a more resource efficient configuration. This is a more resource efficient configuration, but provides fewer transmission opportunities for the UEs.

Therefore, the base station 702 can flexibly configure these mapping associations to achieve different trade-offs between resource efficiency and transmission opportunities for PRACH repetitions.

FIG. 12 is a flow chart 12000 of a method (process) for preforming multiple PRACH transmissions. The method may be performed by a UE (e.g., the UE 704, the UE 250). In operation 1202, the UE receives, from a base station, random access channel (RACH) occasion (RO) configurations indicating associations between one or more synchronization signal blocks (SSBs) and ROs. In operation 1204, the UE selects one SSB from the one or more SSBs received from the base station.

In operation 1206, the UE determines, at least based on a reference signal received power (RSRP) measurement of the selected SSB, a number of multiple PRACH transmissions. In operation 1208, the UE determines, based on the RO configurations and the determined number of multiple PRACH transmissions, a set of RO groups associated with the selected SSB for transmitting the determined number of multiple PRACH transmission. In operation 1210, the UE determines a subset of PRACH preambles based on the determined number of multiple PRACH transmissions. In operation 1212, the UE selects a PRACH preamble to be transmitted over the multiple PRACHs on the selected RO group from the subset of PRACH preambles.

In certain configurations, the subset of PRACH preambles is determined based on an indication received from the base station. In certain configurations, the RO configurations indicate a set of PRACH preambles associated with each SSB of the one or more SSBs and each candidate number of multiple PRACH transmissions. The UE further determines one set of PRACH preambles based on the selected SSB and the determined number of multiple PRACH transmissions. The UE further selects a PRACH preamble from the determined one set of PRACH preambles to be transmitted over the multiple PRACHs on the selected RO group. In certain configurations, the UE determines the each candidate number of multiple PRACH transmissions based on an indication received from the base station.

In operation 1214, the UE transmits multiple PRACHs on a selected RO group from the determined set of RO groups.

In certain configurations, the RO configurations indicate: a first RO group (RO 720, RO 722) for a first number (e.g., 2) of multiple PRACH transmissions corresponding to a given SSB (e.g., SSB 4); and a second RO group (e.g., RO 720, RO 722, RO 724, RO 726) for a second number (e.g., 4) of multiple PRACH transmissions corresponding to the given SSB, wherein the first number is different from the second number.

In certain configurations, the RO configurations indicate: a first RO group for multiple PRACH transmissions corresponding to a first SSB; and a second RO group for multiple PRACH transmissions corresponding to a second SSB.

In certain configurations, the first RO group (e.g., RO 920, RO 922, RO 924, RO 926 corresponding to SSB 4) and the second RO group (e.g., RO 930, RO 932, RO 934, RO 936 corresponding to SSB 1) do not overlap in time domain or frequency domain. The number of multiple PRACHs transmitted on the first RO group and the number of multiple PRACHs transmitted on the second RO group may be the same. In certain configurations, multiple PRACH preambles transmitted on the first RO group and the number of multiple PRACH preambles transmitted on the second RO group may be the same.

In certain configurations, the first RO group (e.g., RO 920, RO 922 corresponding to SSB 4) fully overlaps with the second RO group (e.g., RO 920, RO 922, RO 924, RO 926 corresponding to SSB 5) in time domain and frequency domain. The number (e.g., 2) of multiple PRACHs transmitted on the first RO group and the number (e.g., 4) of multiple PRACHs transmitted on the second RO group may be different. In certain configurations, multiple PRACH preambles transmitted on the first RO group and multiple PRACH preambles transmitted on the second RO group may be different.

In certain configurations, some but not all ROs of the first RO group (e.g., RO 720, RO 722, RO 724, RO 726 corresponding to SSB 4) overlap with the second RO group (e.g., RO 730, RO 732, RO 724, RO 726 corresponding to SSB 7) in time domain or frequency domain.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a base station, random access channel (RACH) occasion (RO) configurations indicating associations between one or more synchronization signal blocks (SSBs) and ROs;

selecting one SSB from the one or more SSBs received from the base station;

determining, at least based on a reference signal received power (RSRP) measurement of the selected SSB, a number of multiple physical random access channel (PRACH) transmissions;

determining, based on the RO configurations and the determined number of multiple PRACH transmissions, a set of RO groups associated with the selected SSB for transmitting the determined number of multiple PRACH transmissions, wherein the RO configurations require that all repeated PRACH transmissions in a selected RO group are transmitted using a same SSB index corresponding to the selected SSB, and wherein the RO configurations indicate, for the selected RO group, a first number of frequency-domain ROs available at a first time instance and a second number of frequency-domain ROs available at a second time instance later than the first time instance, the second number being less than the first number; and transmitting multiple PRACHs on the selected RO group, wherein each of the multiple PRACHs is transmitted using the same SSB index.

2. The method of claim 1, wherein the RO configurations indicate:

a first RO group for a first number of multiple PRACH transmissions corresponding to a given SSB; and a second RO group for a second number of multiple PRACH transmissions corresponding to the given SSB, wherein the first number is different from the second number.

3. The method of claim 1, wherein the RO configurations indicate:

a first RO group for multiple PRACH transmissions corresponding to a first SSB; and a second RO group for multiple PRACH transmissions corresponding to a second SSB.

4. The method of claim 3, wherein the first RO group and the second RO group do not overlap in time domain or frequency domain.

5. The method of claim 4, wherein the number of multiple PRACHs transmitted on the first RO group and the number of multiple PRACHs transmitted on the second RO group are the same.

6. The method of claim 4, wherein multiple PRACH preambles transmitted on the first RO group and the number of multiple PRACH preambles transmitted on the second RO group are the same.

7. The method of claim 3, wherein the first RO group fully overlaps with the second RO group in time domain and frequency domain.

8. The method of claim 7, wherein the number of multiple PRACHs transmitted on the first RO group and the number of multiple PRACHs transmitted on the second RO group are different.

9. The method of claim 7, wherein multiple PRACH preambles transmitted on the first RO group and multiple PRACH preambles transmitted on the second RO group are different.

10. The method of claim 3, wherein some but not all ROs of the first RO group overlap with the second RO group in time domain or frequency domain.

11. The method of claim 1, further comprising:

determining a subset of PRACH preambles based on the determined number of multiple PRACH transmissions; and selecting a PRACH preamble to be transmitted over the multiple PRACHs on the selected RO group from the subset of PRACH preambles.

12. The method of claim 11, wherein the subset of PRACH preambles is determined based on an indication received from the base station.

13. The method of claim 1, wherein the RO configurations indicate a set of PRACH preambles associated with each SSB of the one or more SSBs and each candidate number of multiple PRACH transmissions, the method further comprising:

determining one set of PRACH preambles based on the selected SSB and the determined number of multiple PRACH transmissions; and selecting a PRACH preamble from the determined one set of PRACH preambles to be transmitted over the multiple PRACHs on the selected RO group.

14. The method of claim 1, further comprising:

determining the each candidate number of multiple PRACH transmissions based on an indication received from the base station.

15. An apparatus for wireless communication, the apparatus being a user equipment (UE), comprising:

a memory; and at least one processor coupled to the memory and configured to:

receive, from a base station, random access channel (RACH) occasion (RO) configurations indicating associations between one or more synchronization signal blocks (SSBs) and ROs;

select one SSB from the one or more SSBs received from the base station;

determine, at least based on a reference signal received power (RSRP) measurement of the selected SSB, a number of multiple physical random access channel (PRACH) transmissions;

determine, based on the RO configurations and the determined number of multiple PRACH transmissions, a set of RO groups associated with the selected SSB for transmitting the determined number of multiple PRACH transmissions, wherein the RO configurations require that all repeated PRACH transmissions in a selected RO group are transmitted using a same SSB index corresponding to the selected SSB, and wherein the RO configurations indicate, for the selected RO group, a first number of frequency-domain ROs available at a first time instance and a second number of frequency-domain ROs available at a second time instance later than the first time instance, the second number being less than the first number; and transmit multiple PRACHs on the selected RO group, wherein each of the multiple PRACHs is transmitted using the same SSB index.

16. The apparatus of claim 15, wherein the RO configurations indicate:

a first RO group for a first number of multiple PRACH transmissions corresponding to a given SSB; and a second RO group for a second number of multiple PRACH transmissions corresponding to the given SSB, wherein the first number is different from the second number.

17. The apparatus of claim 15, wherein the RO configurations indicate:

a first RO group for multiple PRACH transmissions corresponding to a first SSB; and a second RO group for multiple PRACH transmissions corresponding to a second SSB.

18. The apparatus of claim 17, wherein the first RO group and the second RO group do not overlap in time domain or frequency domain.

19. The apparatus of claim 18, wherein the number of multiple PRACHs transmitted on the first RO group and the number of multiple PRACHs transmitted on the second RO group are the same.

20. A non-transitory computer-readable medium storing computer executable code for wireless communication of a user equipment (UE), comprising code to:

receive, from a base station, random access channel (RACH) occasion (RO) configurations indicating associations between one or more synchronization signal blocks (SSBs) and ROs;

select one SSB from the one or more SSBs received from the base station;

determine, at least based on a reference signal received power (RSRP) measurement of the selected SSB, a number of multiple physical random access channel (PRACH) transmissions;

determine, based on the RO configurations and the determined number of multiple PRACH transmissions, a set of RO groups associated with the selected SSB for transmitting the determined number of multiple PRACH transmissions, wherein the RO configurations require that all repeated PRACH transmissions in a selected RO group are transmitted using a same SSB index corresponding to the selected SSB, and wherein the RO configurations indicate, for the selected RO group, a first number of frequency-domain ROs available at a first time instance and a second number of frequency-domain ROs available at a second time instance later than the first time instance, the second number being less than the first number; and transmit multiple PRACHs on the selected RO group, wherein each of the multiple PRACHs is transmitted using the same SSB index.

\* \* \* \* \*